(12) United States Patent
Mayer

(10) Patent No.: US 6,311,796 B1
(45) Date of Patent: Nov. 6, 2001

(54) EQUIPMENT COMPARTMENT WITH SLIDABLE HOOD

(75) Inventor: Robert Rosario Mayer, Clio, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/434,919

(22) Filed: Nov. 5, 1999

(51) Int. Cl.⁷ .................................................. B62D 25/10
(52) U.S. Cl. .................. 180/69.2; 180/89.17; 180/69.24
(58) Field of Search .................. 180/69.2, 69.21, 180/69.24, 232, 89.17; D25/119, 122, 124; 296/76

(56) References Cited

U.S. PATENT DOCUMENTS

| | | | |
|---|---|---|---|
| D. 431,658 | * 10/2000 | Gregori | D25/122 |
| 2,837,372 | 6/1958 | Odom | 296/76 |
| 3,754,614 | 8/1973 | Habas | 180/69 C |
| 3,767,001 | 10/1973 | Chupick | 180/69 C |
| 4,270,623 | * 6/1981 | Brandi et al. | 180/69.2 |

* cited by examiner

*Primary Examiner*—J. J. Swann
*Assistant Examiner*—David Divine
(74) *Attorney, Agent, or Firm*—George A. Grove; Jeffrey A. Sedlar

(57) ABSTRACT

An equipment (engine) compartment at one end of an automotive vehicle is closed by a structurally stiff hood panel having laterally opposite edges supported in side rails. The hood panel is longitudinally slidable in the side rails between a closed position covering an upper opening and an open position wherein the hood panel is moved to a longitudinally outward position along the rails to open the compartment for servicing equipment in the compartment. Releasable latches hold the hood panel closed until released for sliding to the open position with a releasable stop for full removal of the panel. The hood panel and side rails are preferably extruded members forming structurally stiff box sections that provide significant energy absorption to the front structure of the vehicle.

7 Claims, 2 Drawing Sheets

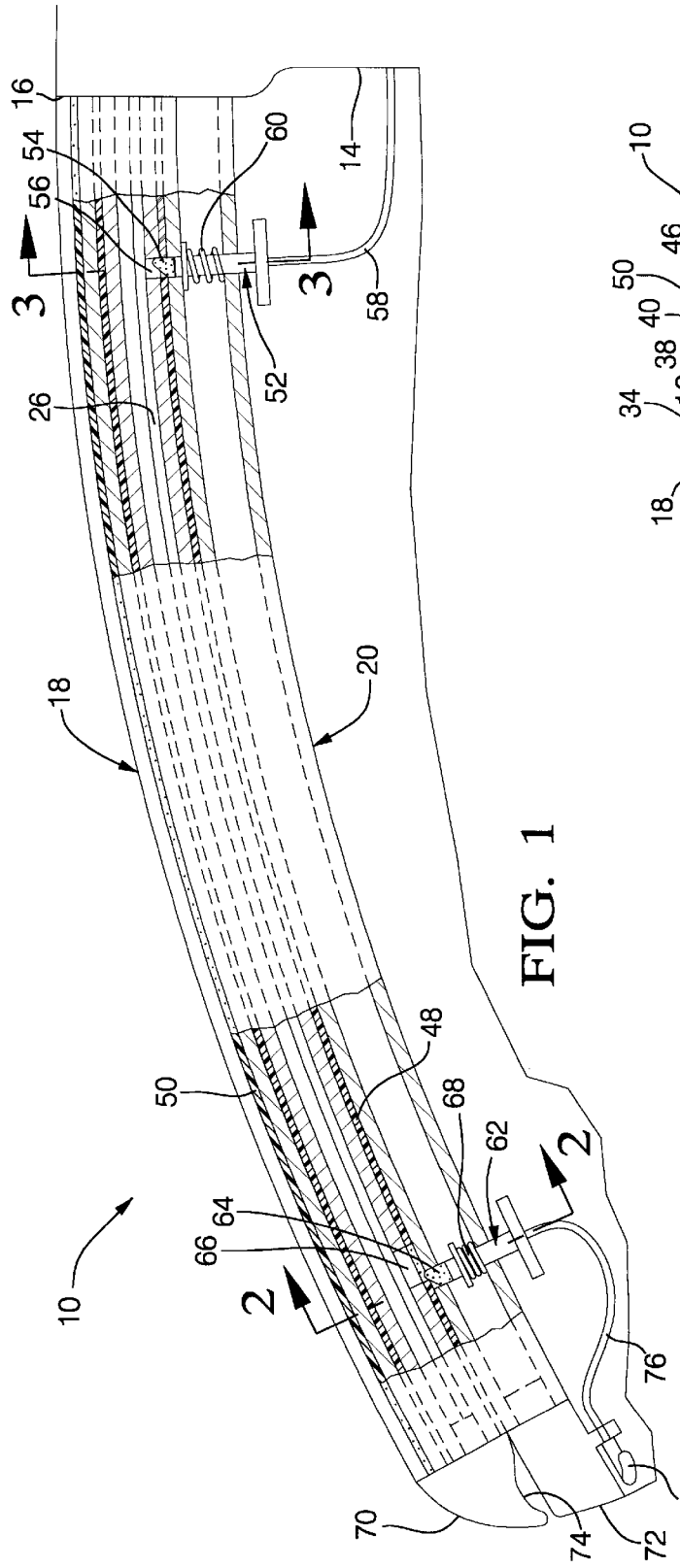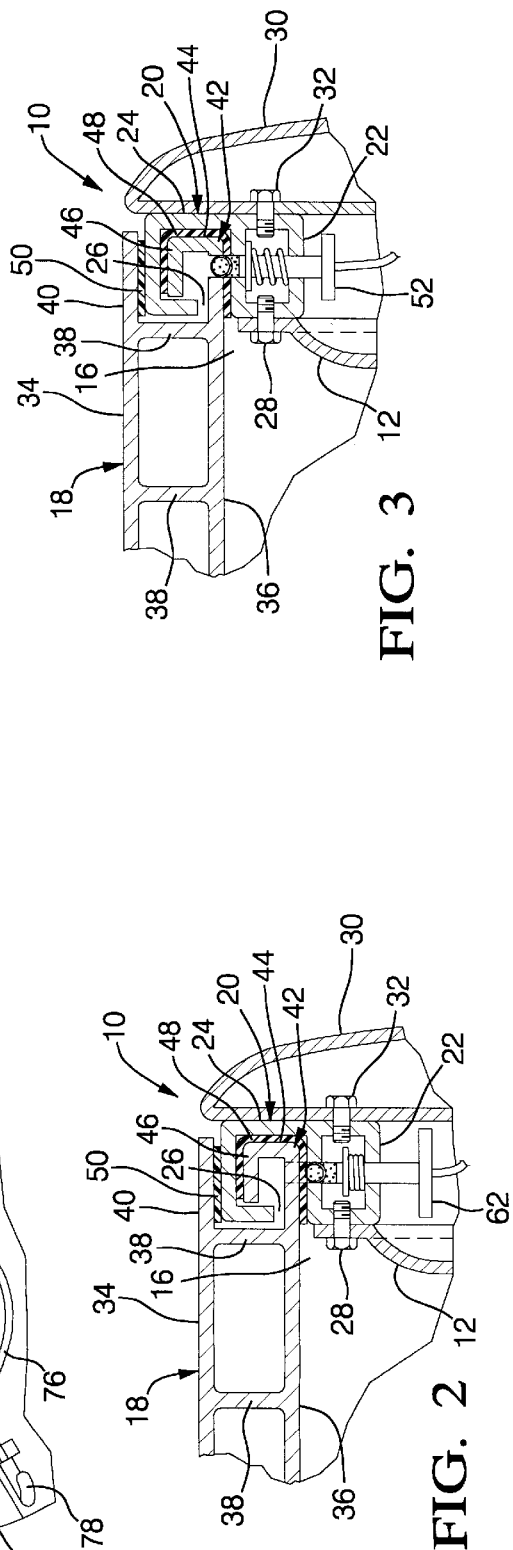

EQUIPMENT COMPARTMENT WITH SLIDABLE HOOD

TECHNICAL FIELD

This invention relates to automotive vehicles and in particular to equipment compartments, such as the engine compartments, containing engines and other equipment and located toward the front or rear end of a vehicle. In particular, the invention relates to an equipment compartment provided with a longitudinally slidable energy-absorbing hood.

BACKGROUND OF THE INVENTION

In the art relating to automotive vehicles, and particularly to automobile-type vehicles, energy absorption is generally provided by structural members of the frame or body designed to absorb collision energy to reduce the deceleration rate of an associated passenger compartment in a collision. In most such vehicles, the engine hood provides little, if any, of the energy-absorbing structure. Hoods are generally formed of stamped sheet metal with vibration and sound-absorbing stiffeners and are attached only at the front and rear ends of the hood. Thus, the hood structure generally bends in a front collision without significant energy absorption being provided to the body structure. It is considered that the provision of an energy-absorbing hood structure for the front or rear end equipment compartment of a vehicle would have benefits in increasing energy absorption or allowing the design of other structural components of the body to better accomplish goals of structural integrity and weight reduction.

SUMMARY OF THE INVENTION

The present invention provides an improved equipment compartment structure having a structurally stiff hood panel that is guided in structurally stiff side rails for longitudinal sliding motion between open and closed positions to provide for observation or servicing of an engine or other equipment within the compartment.

The hood panel may be advantageously formed of extruded aluminum or, alternatively, by other suitable means and/or materials. The panel preferably includes upper and lower walls interconnected vertically by longitudinally extending laterally spaced support walls, which form structurally stiff box sections that provide structural rigidity to the panel. Laterally outer edges of the panel are formed with slide portions that are received in tracks or guide recesses of support or side rails mounted at the upper edges of side walls of the equipment compartment. The side rails may also be made of structurally stiff aluminum extrusions to provide the desired tracks for sliding of the hood panel, as well as means for attaching the support rails to inner and outer panels of the vehicle body and the equipment compartment.

To maintain the hood panel edges completely within the tracks for maximum energy absorption during a collision, the hood panel edges and the associated support rails define arcs of a large constant radius having a value up to infinity in the case of a flat panel. Latches are provided in the side rails, or elsewhere in the structure, for retaining the hood panel in the closed position but allowing release of the panel for sliding forward in the support rails to an open position for inspection or service of the engine and other equipment in the compartment.

A second set of latches prevents unintended sliding of the hood panel beyond the desired open position of the panel in its forward open position. The second latches may also initially urge the panel outward when the first latches are released. The second latches may also be released from a suitable location on the body to allow complete removal of the hood from the body structure and provide better access for repair or servicing of equipment within and forward (or aft) of the vehicle equipment compartment.

These and other features and advantages of the invention will be more fully understood from the following description of certain specific embodiments of the invention taken together with the accompanying drawings.

BRIEF DESCRIPTION OF THE DRAWINGS

In the drawings:

FIG. 1 is a fragmentary cross-sectional side view of an equipment compartment with a closed hood panel slidably carried in side rails according to the invention;

FIG. 2 is a fragmentary transverse cross-sectional view from the plane of the line 2—2 of FIG. 1;

FIG. 3 is a fragmentary transverse cross-sectional view from the plane of the line 3—3 of FIG. 1.

DESCRIPTION OF THE PREFERRED EMBODIMENT

Figure 4:
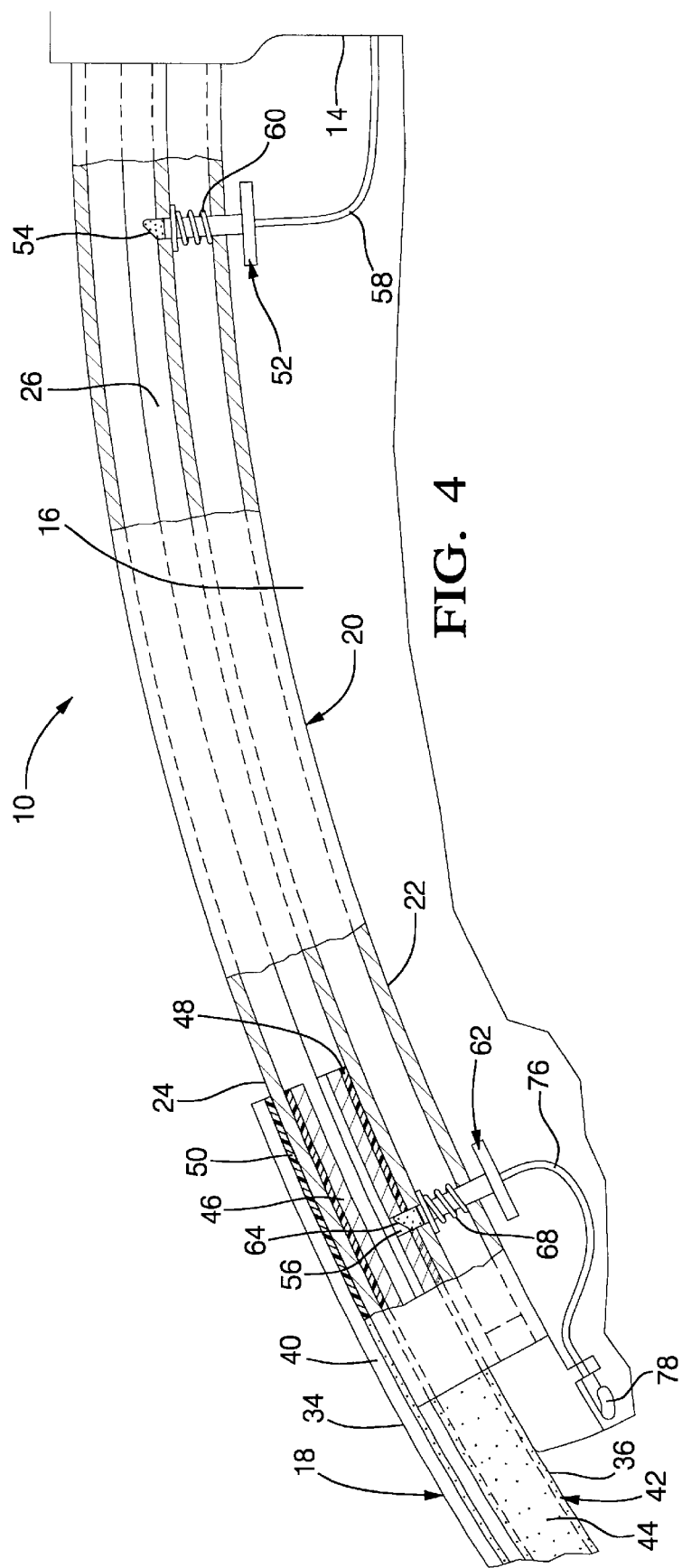
FIG. 4 is a cross-sectional side view similar to FIG. 1 but showing the hood panel in an open position.

Referring now to the drawings in detail, numeral 10 generally indicates an automobile vehicle engine and equipment compartment located at the forward end of a vehicle. Compartment 10 includes a pair of laterally spaced side walls 12, only one being shown, and a rear end wall 14. The front end, not shown, of the compartment is open to allow air to enter and pass through the compartment, generally exiting through a lower open portion. The side walls and rear end wall also define an upper opening 16 of the compartment 10 which is normally closed by a hood panel 18 to be subsequently further discussed.

Along the upper edges of the side walls 12 of the engine compartment are mounted side rails 20. The side rails 20 are formed as arcs of a large constant radius, thus having a relatively shallow curvature sloping increasingly downward toward the front of the vehicle. The rails are preferably formed as extruded aluminum sections including a relatively stiff lower box section 22 supporting an upwardly adjoining partial box section 24 having an inner side open with a gap 26. The lower box section 22 is secured on an inner side, by suitable means such as bolts 28, to upper edges of the side walls 12 forming the compartment 10. A fender or outer vehicle panel 30 is secured as by bolts 32 to an outer side of the lower box section 22. If desired, other means, such as adhesives, might be used to hold the upper portions of the fender 30 to the upper box section 24.

The hood panel 18, which extends between the side rails 20, is preferably also formed as an aluminum extrusion. It includes an upper wall 34, a lower wall 36 and a plurality of longitudinally extending laterally spaced support walls 38. These form a plurality of structurally stiff longitudinally extending box sections that give the hood panel structural stiffness or rigidity and provide a substantial degree of energy absorption capability. At its outer edges, the hood panel includes laterally extending upper lips 40 which cover the upper portions of the side rails 20. The lips 40 extend to points adjacent the fenders 30, leaving gaps therebetween for allowing relative motion between the hood and fenders. The lower wall 36 of the hood also extends outwardly at its edges through the gaps 26 in the side rails 20 and into the partially open box sections 24. Stiffening C-flanges 42 comprise the extended lower wall 36 and adjoin vertical walls 44 and connecting horizontal walls 46 of the side rails 20.

The outer edge C-flanges 42 and upper lips 40 of the hood panel 18 are also formed as arcs of the same constant radius as the side rails. Thus, the C-flanges 42 may be slidably received within the upper box sections 24 of the side rails by sliding the hood panel C-flanges into the partial box sections 24 of the side rails from their front edges, with the lower walls 36 passing through the gaps 26 as previously described. The upper lips 40, which are extensions of the upper walls 34, extend above the side rails 20, preferably with a small clearance gap, while the C-flanges 42 are formed to support the load of the hood panel 18 as it is supported by and slidable within the upper box sections 24 of the side rails 20. If desired, the upper lips 40 could also be utilized as support surfaces for the hood on the upper sides of the side rails 20.

In order to reduce friction in sliding of the hood panel within the side rails, a plastic bearing material, such as nylon, may be applied between the sliding surfaces. For example, U-shaped nylon sheets 48 may be applied around the outer surfaces of the C-flanges 42 at the edges of the hood panel. Sheets 48 will thus support both vertical and lateral bearing loads applied to the side rails, allowing sliding of the hood panel 18 in the side rails to be accomplished with relatively low friction.

Optionally, additional nylon sheets 50 could be applied either to the lower sides of the upper lips 40 or to the upper surfaces of the side rails 20 in place of, or in addition to, having nylon bearing sheets 48 extend between the lower walls 36 of the hood panel 18 and the upper walls of the lower side rail box sections 22.

In order to hold the hood panel 18 in the closed position as shown in FIG. 1, the engine/equipment compartment 10 is provided with releasable means in the form of spring loaded latches 52 which extend through openings in the lower and upper walls of the box section 22 and protrude with angled latch ends 54 of nylon or the like into keeper openings 56 formed in the edges of the lower walls 36 of the hood panel 18. Release cables 58 are provided which extend into the passenger compartment, not shown, of the vehicle for pulling the latches 52 downward against biasing springs 60 to release the hood panel and allow it to slide forward toward its open position as shown in FIG. 4.

In order to initiate sliding of the hood panel upon actuating the release cables 58, second releasable means in the form of latches 62 or other suitable means may be employed. Like latches 52, latches 62 also have nylon-tipped latch ends 64 which are angled and aligned to enter second keeper openings 66. Biasing springs 68 urge the latches 62 upward so that the angled portions of the latch ends 64 engage the forward edges of the second keeper openings 66. Thus, when latches 52 are released by actuation of the cables 58, the biasing springs 68 force the latch ends 64 upward so that the angled surfaces force the latch ends 64 into the second keeper opening 66. In this motion, the angled surfaces bear against the forward ends of openings 66, causing the hood 18 to slide forward as the latches 62 are forced into the openings. Keeper openings 66 are elongated so that upon initial movement of the hood, it will slide forward a predetermined distance beyond the front edge of the side rails 20.

For closing the front edges of the side rails 20 and the hood panel 18, the hood panel is provided with an extending front edge trim portion 70 which is attached to the open ends of the trim panel by any suitable means, not shown. Similar trim portions 72 may be attached to the open front edge of the lower box section 22 of each of the side rails so as to form a desirably curved front surface of the hood 18 connecting smoothly with the surface of the trim portions 72. The front lower surface of trim portion 70 is provided with a finger recess 74.

Thus, when the hood panel 18 is slid forward by urging of the second latches 62 after release of the first latches 52, the hood trim portion 70 slides forward so that the front edge may be grasped by the vehicle service person in order to slide the hood further forward to the open position shown in FIG. 4. To accomplish this, cables 76 are connected with the latches 62 and with a release lever 78 located in a suitable front portion of the vehicle body to allow the secondary latches 62 to be released when the service person has the hood in hand control. The hood then slides or is slid forward until the secondary latches 62 are aligned with the first keeper openings 56. Latches 62 then engage the first keeper openings 56 and lock the hood in the forward open position which allows the service person to observe and service internal equipment and portions of the engine which require servicing.

On occasions when more extensive service of the vehicle is required, the slidable hood panel may be completely removed from the vehicle by again actuating the release lever 78, actuating cables 76 to release latches 62 from the keeper openings 56. The hood may then be slid further forward and completely out of the partial box sections 24 of the side rails and placed aside in a suitable location until the servicing of the vehicle is complete and the hood is again able to be slid back into the side rails as before. The latches 62, 52 are angled such that, upon sliding the hood into the side rails from the front, the latches are forced downwardly by the rearward sliding motion under the control of the service person. Thus, the hood passes over both the secondary latches 62 and the primary latches 52 until the keeper openings 56 are again penetrated by the latch ends 54 of latches 52 and the hood is again fixed or retained in its closed position. The latch ends 54 and 64 are preferably made from a bearing material, such as nylon, or at least coated with such a material, so that they will slide easily against the lower wall 36 at the outer edges of the hood panel.

It should be apparent that a hood panel according to the invention may be formed with any desired degree of curvature as long as it is an arc of a circle of large radius. The panel can be made flat, if desired, in which case the radius would be of infinite length.

When used as an engine hood, the panel 18 and associated side rails provide a contained structure capable of adding significant energy absorption in the front structure of the vehicle when the engine compartment is crushed or deformed in a front end collision. Thus, greater front end energy absorption may be provided while still retaining serviceability of the vehicle engine and equipment located in the forward (or rear) engine compartment.

While the invention has been described by reference to certain preferred embodiments, it should be understood that numerous changes could be made within the spirit and scope of the inventive concepts described. Accordingly, it is intended that the invention not be limited to the disclosed embodiments but that it have the full scope permitted by the language of the following claims.

What is claimed is:

1. An equipment compartment integrated into vehicle structure at one end of an automotive vehicle, said compartment comprising:

laterally spaced side walls and at least one end wall extending essentially to upper edges of the compartment and at least partially defining an upper opening of the compartment;

a pair of support rails mounted on said side walls adjacent the upper edges of the compartment and extending generally parallel and longitudinally of the vehicle;

a structurally stiff hood panel having laterally opposite edges supported in said rails and extending essentially horizontally between the rails, the panel being longitudinally slidable therein between a closed position wherein said hood panel covers said upper opening and an open position wherein the hood panel is moved to a longitudinally outward position along the rails to open the compartment for servicing equipment in the compartment; and releasable means for releasably holding said hood panel in said closed position and means for preventing unintended outward movement of the panel beyond said open position.

2. An equipment compartment as in claim 1 wherein said outward movement preventing means is releasable to allow removal of the panel from the vehicle by sliding the panel further outward beyond said rails for better access during servicing of the equipment.

3. An equipment compartment as in claim 1 wherein said hood panel is an extruded member having upper and lower walls interconnected by longitudinally extending laterally spaced support walls forming structurally stiff box sections.

4. An equipment compartment as in claim 1 wherein said laterally opposite edges of the hood panel and associated portions of the support rails define arcs of a constant radius.

5. An equipment compartment as in claim 1 wherein said releasable means include latches releasably connecting the hood and the support rails.

6. An equipment compartment as in claim 4 including plastic bearing material between said rails and the hood panel to slidably support the hood panel on the rails.

7. An equipment compartment as in claim 6 wherein the plastic bearing material supports and guides the hood panel in both vertical and lateral directions.

* * * * *